United States Patent [19]

De Vos et al.

[11] Patent Number: 5,851,458
[45] Date of Patent: Dec. 22, 1998

[54] METHOD OF FORMING A THERMAL INSULATING DEVICE

[75] Inventors: Rik De Vos, Varese, Italy; Guy Leon Jean Ghislain Biesmans, Everberg; Alan James Hamilton, Leefdaal, both of Belgium

[73] Assignee: Imperial Chemical Industries PLC, Millbank, United Kingdom

[21] Appl. No.: 761,619

[22] Filed: Dec. 5, 1996

[30] Foreign Application Priority Data

Dec. 11, 1995 [EP] European Pat. Off. .............. 95203438

[51] Int. Cl.$^6$ ........................... B29C 44/06; B29C 44/12
[52] U.S. Cl. ........................ 264/46.5; 264/46.6; 264/102
[58] Field of Search ...................... 428/69, 71; 264/46.5, 264/46.6, 102

[56] References Cited

U.S. PATENT DOCUMENTS

| | | |
|---|---|---|
| 1,898,977 | 2/1933 | Comstock . |
| 2,629,698 | 2/1953 | Sterling .................................. 264/46.5 |
| 3,303,076 | 2/1967 | Carlson, Jr. et al. ..................... 428/71 |
| 3,850,714 | 11/1974 | Adorjan ..................................... 156/77 |
| 3,890,414 | 6/1975 | Ricciardi et al. ....................... 264/45.1 |
| 4,552,601 | 11/1985 | Hirano et al. ............................. 428/71 |
| 5,066,437 | 11/1991 | Barito et al. ........................... 264/46.6 |
| 5,082,335 | 1/1992 | Cur et al. ................................. 428/69 |
| 5,171,346 | 12/1992 | Hallett .................................... 264/46.5 |
| 5,234,964 | 8/1993 | Lin et al. .................................. 521/99 |
| 5,346,928 | 9/1994 | De Vos et al. .......................... 521/166 |
| 5,397,809 | 3/1995 | Ward, III et al. ....................... 521/125 |
| 5,413,848 | 5/1995 | Jaster et al. .......................... 428/305.5 |
| 5,587,220 | 12/1996 | Ogawa ...................................... 428/71 |

FOREIGN PATENT DOCUMENTS

| | | | |
|---|---|---|---|
| 0662494 | 7/1995 | European Pat. Off. . | |
| 62-94449 | 4/1987 | Japan ....................................... 428/71 |
| 64-16642 | 1/1989 | Japan ....................................... 428/71 |
| 86/04017 | 7/1986 | WIPO . | |
| 91/09901 | 7/1991 | WIPO . | |
| WO 91/12391 | 8/1991 | WIPO ..................................... 428/71 |
| 95/00580 | 1/1995 | WIPO . | |
| 95/20136 | 7/1995 | WIPO . | |

*Primary Examiner*—Allan R. Kuhns

[57] ABSTRACT

Thermal insulating device with an open celled polyurethane foam core, evacuated and refilled with an insulating gas.

10 Claims, No Drawings

METHOD OF FORMING A THERMAL INSULATING DEVICE

This invention relates to thermal insulating devices or apparatus such as refrigerators, freezers and water boilers.

Conventionally, these thermal insulating devices have a foam core located between the outer and inner walls of the thermal insulating unit. The foam core generally consists of a closed cell foam, e.g. polyurethane foam, with blowing agent present in the cells contributing to the high thermal insulation effect. It has been found that the best-suited blowing agents, namely chlorofluorocarbons, have some detrimental environmental effects; other environmentally more acceptable blowing agents such as hydrochlorofluorocarbons and hydrofluorocarbons provide for a noticeably reduced insulation effect.

It has already been proposed to go an entirely different way and provide within the core of the device hermetically sealed, highly evacuated insulation panels filled with an insulating material such as open celled polyurethane foam (see JP-A-133870/82, EP-A-498628, EP-A-188806). These tend to be expensive if they have to be made such that their high insulation effect remains intact during the required lifetime of the device.

Alternatively the core of the thermal device itself is being filled with open celled foam, evacuated and hermetically sealed. In order to maintain the required high vacuum it has been proposed to permanently connect the unit to a vacuum pump mounted in the unit itself (see WO 95/20136). These proposals require substantial redesign of the thermal insulating device.

It is an object of the present invention to provide a thermal insulating unit or a device containing such a unit not showing the disadvantages mentioned above.

The present invention provides a method for making a thermal insulating unit or a device containing such a unit, said unit comprising a core of open celled organic foamed insulating material located between the outer and inner walls of the unit, comprising the steps of a) direct foaming of the insulating material in the cavity formed between the outer and inner walls of the unit;

b) evacuating the foamed cavity;

c) refilling the foamed cavity with an insulating gaseous composition; and d) sealing the cavity.

The method of the present invention does not require any substantial modification to traditional manufacturing lines for thermal insulating devices such as refrigerators.

The thermal insulating devices obtained maintain a satisfactory level of thermal insulation over the lifetime of the device without the necessity of redesigning the device.

The insulating gaseous composition to be used in the present invention preferably has a boiling point below the operational temperature of the thermal device so as to prevent condensation of the gaseous composition on the cold side of the device. Thus, for refrigerators, the boiling point is preferably below room temperature, more preferably below 10° C., most preferably below 0° C.

The insulating gaseous composition for use in the present invention may consist of one insulating gas or vapour or may contain a mixture of several of such insulating gases or vapours.

Preferably the insulating gaseous composition has a thermal conductivity lower than the thermal conductivity of air or $CO_2$ (i.e. below 25 mW/mK, preferably below 16 mW/mK). The insulating gases are preferably non-toxic, non flammable and are halogen (particularly chlorine) free.

Examples of preferred insulating gases or vapours include: Krypton, Xenon, sulfur hexafluoride, disilane, dimethylsilane, hexafluoroacetone, monofluoromethane, 1,1,1-trifluoroethane, octafluoro-2-butene, 1,1,2,2-tetrafluoroethane, decafluorobutane, pentafluoroethane, ethylfluoride, tetrafluoroethylene, propylene, 1,3-butadiene, hexafluoroethane, tetrafluoromethane, trifluorobromomethane, trifluoromethane, 1,1-difluoroethylene, difluoromethane, vinylfluoride, 1,1,1,2-tetrafluoroethane, trans-2-butene, bromotrifluoroethylene, 1,2-propadiene, 1,1,2-trifluoroethane, hexafluoropropylene, octafluorocyclobutane, 1,1-difluoroethane, isobutene, 1,2-difluoroethane, dimethylether, 1-butene, n-butane, octafluoropropane, 1,1-difluoroethane, isobutane, cyclopropane, methylacetylene, dibromofluoromethane, fluoromethane, trimethylsilane, vinylacetylene, bromotrifluoroethylene, vinylbromide, 1,2-butadiene, cis-2-butene, methylethylether, neopentane, propadiene, cyclobutane, methylvinylether, ethylacetylene, difluorodibromomethane, bromofluoromethane, 1,1,1,2,2,3,3-heptafluoropropane, 1,1,1,2,3,3,3-heptafluoropropane, 1,1,2,2,3,3-hexafluoropropane, 1,1,1,2,2,2-hexafluoropropane, 1,1,1,2,3,3-hexafluoropropane, 1,1,1,3,3,3-hexafluoropropane, 1,1,2,2,3-pentafluoropropane, 1,1,1,2,2-pentafluoropropane, 1,1,1,3,3-pentafluoropropane, 1,1,1,3,3-pentafluorobutane, perfluoropentane, perfluorobutane, perfluorohexane and 1,1,1,4,4,4-hexafluorobutane. Other suitable insulating gases or vapours include: bromochlorodifluoromethane, chloropentafluoroethane, 1,2-dichlorotetrafluoethane, dichlorodifluoromethane, 1-chloro-1,1-difluoroethane, vinylchloride, methylchloride, chlorotrifluoromethane, bromotrifluoromethane, bromodichloromethane, dichlorofluoromethane, chlorodifluoromethane, chlorobromofluoromethane, chlorofluoromethane, 1,1-dichlorotetrafluoroethane, ethylchloride, methylbromide, trichlorofluoromethane, bromodichlorofluoromethane, dibromofluoromethane, 1,1,2-trichloro-1,2,2-trifluoroethane, 1,1,1-trichloro-1,2,2-trifluoroethane, 1,2-dichloro-1,1,2,2-tetrafluoroethane, 2,2-dichloro-1,1,1,2-tetrafluoroethane, 1-chloro-1,1,2,2,2-pentafluoroethane, 1,1,1-trifluoro-2,2-dichloroethane, 1,1-dichloro-1,1,2-trifluoroethane, 1,1,1,2-tetrafluoro-2-chloroethane, 1,1,2,2-tetrafluoro-1-chloroethane, 1,2-dichloro-1,2-difluoroethane,1,1-dichloro-1,2-difluoroethane,1,2-dichloro-1,1-difluoroethane, 1,1,2-trifluoro-2-chloroethane, 1,1,1-trifluoro-2-chloroethane, 1-chloro-1,2-difluoroethane, 1,2-dichloro-1-fluoroethane, 1,1-dichloro-1-fluoroethane, 1,1-difluoro-2-chloroethane and further tetrafluorohydrazine, hydrogenbromide, germaniumtetrahydride, carbonylsulfide, hydrogeniodide, sulfurdioxide, cyanogen, formaldehyde and phosgene.

Generally the cavity of the thermal insulating device is being filled with the insulating gaseous composition to a pressure level in the range of 100 mbar to 2 bar, preferably 100 mbar to 1 bar.

The open celled organic foamed insulating material to be used in the present invention may be derived from the following materials: polyurethanes, polystyrenes, polyethylenes, acrylics, phenolics (such as phenol formaldehyde), halogenated polymers such as polyvinylchloride. Preference is given to open celled polyurethane foams, especially those of a rigid nature.

The foam is termed open celled when the open cells amount to at least about 30%, preferably 50% of the total cell mass and are distributed such that they form through chains enabling a more or less sluggish suction through the material. A foam having at least 75% open cells is preferred.

Open celled rigid polyurethane and urethane-modified polyisocyanurate foams are in general prepared by reacting the appropriate organic polyisocyanate and polyfunctional isocyanate-reactive compound in the presence of a cell-opening agent. Examples of formulations for making open celled rigid polyurethane foam are described in EP-A-0498628, WO 95/02620 and EP-A-0188806.

Suitable organic polyisocyanates for use in the preparation of open celled rigid polyurethane foams include any of those known in the art for the preparation of rigid polyurethane or urethane-modified polyisocyanurate foams, and in particular the aromatic polyisocyanates such as diphenylmethane diisocyanate in the form of its 2,4'-, 2,2'- and 4,4'-isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2, toluene diisocyanate in the form of its 2,4- and 2,6-isomers and mixtures thereof, 1,5-naphthalene diisocyanate and 1,4-diisocyanatobenzene. Other organic polyisocyanates which may be mentioned include the aliphatic diisocyanates such as isophorone diisocyanate, 1,6-diisocyanatohexane and 4,4'-diisocyanatodicyclohexylmethane.

Polyfunctional isocyanate-reactive compositions for use in the preparation of open celled rigid polyurethane foams include any of those known in the art for the preparation of rigid polyurethane or urethane-modified polyisocyanurate foams. Of particular importance for the preparation of rigid foams are polyols and polyol mixtures having average hydroxyl numbers of from 300 to 1000, especially from 300 to 700 mg KOH/g, and hydroxyl functionalities of from 2 to 8, especially from 3 to 8. Suitable polyols have been fully described in the prior art and include reaction products of alkylene oxides, for example ethylene oxide and/or propylene oxide, with initiators containing from 2 to 8 active hydrogen atoms per molecule. Suitable initiators include: polyols, for example glycerol, trimethylolpropane, triethanolamine, pentaerythritol, sorbitol and sucrose; polyamines, for example ethylene diamine, tolylene diamine, diaminodiphenylmethane and polymethylene polyphenylene polyamines; and aminoalcohols, for example ethanolamine and diethanolamine; and mixtures of such initiators. Other suitable polymeric polyols include polyesters obtained by the condensation of appropriate proportions of glycols and higher functionality polyols with dicarboxylic or polycarboxylic acids. Still further suitable polymeric polyols include hydroxyl terminated polythioethers, polyamides, polyesteramides, polycarbonates, polyacetals, polyolefins and polysiloxanes. The quantities of the polyisocyanate compositions and the polyfunctional isocyanate-reactive compositions to be reacted will depend upon the nature of the rigid polyurethane or urethane-modified polyisocyanurate foam to be produced and will be readily determined by those skilled in the art.

The preparation of open celled rigid polyurethane foam may be carried out in the presence of any of the blowing agents known in the art for the preparation of rigid polyurethane or urethane-modified polyisocyanurate foams. Such blowing agents include water or other carbon dioxide-evolving compounds, or inert low boiling compounds having a boiling point of above −70° C. at atmospheric pressure.

The open celled rigid polyurethane foams to be used in the present invention may be of normal cell size, i.e. having cell sizes in the range 5 mm to 0.1 mm.

In order to further lower the thermal conductivity open celled rigid polyurethane foams having decreased cell sizes (in the range 50 to 150 micron) are preferably used.

These fine celled open celled rigid polyurethane foams can be obtained by incorporating an insoluble fluorinated compound into the foam-forming mixture.

The term insoluble as used herein with reference to the insoluble fluorinated compound to be used in the preparation of fine celled open celled rigid polyurethane foam is defined as showing a solubility in either the isocyanate-reactive composition or the polyisocyanate composition with which it is to be blended of less than 500 ppm by weight at 25° C. and atmospheric pressure.

Insoluble fluorinated compounds for use in the preparation of fine celled open celled rigid polyurethane foam include any of those disclosed in U.S. Pat. No. 4,981,879, U.S. Pat. No. 5,034,424, U.S. Pat. No. 4,972,002, EP-A-0508649, EP-A-0498628 and WO 95/18176.

The term substantially fluorinated as used herein with reference to the insoluble, substantially fluorinated compound to be used in the preparation of fine celled open celled rigid polyurethane foam is to be understood to embrace compounds in which at least 50% of the hydrogen atoms of the unfluorinated compounds are replaced by fluorine.

Suitable compounds include substantially fluorinated or perfluorinated hydrocarbons, substantially fluorinated or perfluorinated ethers, substantially fluorinated or perfluorinated tertiary amines, substantially fluorinated or perfluorinated amino-ethers and substantially fluorinated or perfluorinated sulphones.

Preferred insoluble perfluorinated compounds include perfluoro-n-pentane, perfluoro-n-hexane, perfluoroN-methylmorpholine and perfluoro (4-methylpent-2-ene).

Certain insoluble fluorinated compounds suitable for use in the preparation of fine celled open celled rigid polyurethane foam may themselves act as blowing agents under the conditions pertaining to the foam-forming reaction, particularly where their boiling point is lower than the exotherm temperature achieved by the reaction mixture. For the avoidance of doubt, such materials may, partly or completely, fulfil the function of blowing agent in addition to that of insoluble fluorinated compound.

The amount of the insoluble fluorinated compound to be used in the preparation of fine celled open celled rigid polyurethane foam ranges from 0.05 to 10%, preferably from 0.1 to 5%, most preferably from 0.6 to 2.3% by weight based on the total foam-forming composition.

The insoluble fluorinated compound will usually be incorporated in the foam-forming reaction mixture in the form of an emulsion or preferably a microemulsion in one of the major components, that is to say in the isocyanate-reactive component and/or the polyisocyanate component. Such emulsions or microemulsions may be prepared using conventional techniques and suitable emulsifying agents.

Emulsifying agents suitable for preparing stable emulsions or microemulsions of fluorinated liquid compounds in organic polyisocyanates and/or isocyanate-reactive compounds include surfactants chosen from the group of nonionic, ionic (anionic or cationic) and amphoteric surfactants. Preferred surfactants are fluoro surfactants, silicone surfactants and/or alkoxylated alkanes.

The amount of emulsifying agent used is between 0.02 and 5 pbw per 100 pbw of foam forming reaction system and between 0.05 and 10 pbw per 100 pbw of polyisocyanate or polyol composition.

In addition to the polyisocyanate and polyfunctional isocyanate-reactive compositions, the insoluble fluorinated compound and the blowing agent, the foam-forming reaction mixture will commonly contain one or more other auxiliaries or additives conventional to formulations for the production of open celled rigid polyurethane and urethane-modified polyisocyanurate foams. Such optional additives include crosslinking agents, for examples low molecular weight polyols such as triethanolamine, foam-stabilising agents or surfactants, for example siloxane-oxyalkylene copolymers, urethane catalysts, for example tin compounds such as stannous octoate or dibutyltin dilaurate or tertiary amines such as dimethylcyclohexylamine or triethylene diamine, fire retardants, for example halogenated alkyl phosphates such as tris chloropropyl phosphate or alkyl phosphonates, and cell-opening agents such as inert particles, polymer particles (such as polymer polyols), specific surfactants, incompatible liquids such as solvents or polyols, inorganic fillers such as bentonite clays, silica particles (particularly fumed silica), metal flakes and stearates.

A particularly preferred process for the preparation of open celled fine celled rigid polyurethane or urethane-modified polyisocyanurate foam comprises the step of reacting an organic polyisocyanate with an isocyanate-reactive material in the presence of an isocyanate-reactive cyclic compound of formula:

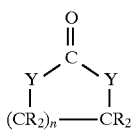
(I)

wherein

Y is O or $NR^1$ wherein each $R^1$ independently is a lower alkyl radical of $C_1-C_6$ or a lower alkyl radical substituted with an isocyanate-reactive group; each R independently is hydrogen, a lower alkyl radical of $C_1-C_6$ or $(CH_2)_m-X$ wherein X is an isocyanate-reactive group which is OH or $NH_2$ and m is 0, 1 or 2; and n is 1 or 2;

with the proviso that at least one of $R^1$ or R is or comprises an isocyanate-reactive group.

A preferred compound of formula (I) wherein Y is O is an isocyanate-reactive cyclic carbonate which is glycerol carbonate.

Preferred compounds of formula (I) wherein Y is $NR^1$ are isocyanate-reactive cyclic ureas of formula:

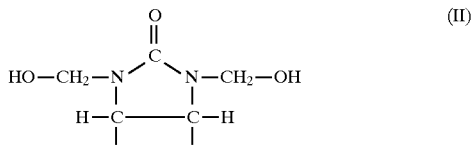
(II)

and

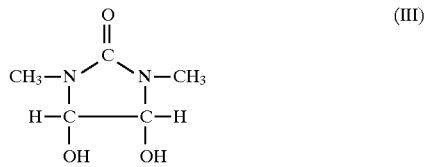
(III)

The isocyanate-reactive cyclic blowing promotor is used in amounts ranging from 0.1 to 99%, preferably from 1 to 60% by weight based on the total isocyanate-reactive material.

Suitable further blowing agents may be used in the said preferred process such as water or inert low boiling compounds having a boiling point of above −50° C. at 1 bar.

The amount of water used as blowing agent may be selected in known manner to provide foams of the desired density, typical amounts being in the range from 0.05 to 5 parts by weight per 100 parts by weight of reactive ingredients, although it may be a particular embodiment of the present invention to incorporate up to 10% by weight or even up to 20% by weight of water.

Suitable inert blowing agents include, for example, hydrocarbons, dialkyl ethers, alkyl alkanoates, aliphatic and cycloaliphatic hydrofluorocarbons, hydrochlorofluorocarbons, chlorofluorocarbons and fluorine-containing ethers. Suitable hydrocarbon blowing agents include lower aliphatic or cyclic hydrocarbons such as n-pentane, isopentane, cyclopentane, neopentane, hexane and cyclohexane.

The process is preferably carried out in the presence of a metal salt catalyst. Preferred metal salt catalysts are those selected among group Ia and group IIa metal salts, more preferably among group Ia and group IIa metal carboxylates.

Particularly suitable metal salt catalysts are potassium acetate and potassium ethylhexoate (for example, Catalyst LB available from Imperial Chemical Industries).

The metal salt catalyst is used in amounts ranging from 0.01 to 3% by weight based on the total reaction system.

In order to decrease the closed cell content particularly in conditions of overpack as during the filling of a refrigerator cavity a supplemental cell opening agent selected from the group consisting of fatty acids, fatty acid amines, fatty acid amides and fatty acid esters can be used.

The term "fatty acid" as used herein is to describe organic carboxylic acids (mono and/or dibasic) having from 7 to 100 carbon atoms, preferably from 10 to 25 carbon atoms, most preferably from 12 to 18 carbon atoms, which can be saturated or unsaturated, aliphatic or cycloaliphatic, unsubstituted or substituted with other functional groups such as hydroxyl groups.

Suitable fatty acids from which these additional cell opening agents are derived include lauric acid, myristoleic acid, palmotoeic acid, palmitic acid, linoleic acid, oleic acid, cetyl acid, stearyl acid. Blends of one or more of these fatty acids are also suitable.

These fatty acids can be used as such or derivatives thereof in the form of amines, amides or esters can be used. So when the fatty acid corresponds to R—COOH, the amine corresponds to R—NR'R", the amide corresponds to R—CO—NR'R" and the ester corresponds to R—COOR'" wherein R' and R" represent hydrogen or an alkyl group having from 1 to 10 carbon atoms and R'" represents an alkyl group having from 1 to 10 carbon atoms. Since the acids can be polyfunctional, the amines, amides and esters derived therefrom can be polyfunctional as well (for example, fatty acid diamines). Polyesters derived from said fatty acid by crosslinking with agents such as glycerol or trimethylolpentane can also be used as well as fully or partially esterified products obtained by reacting the fatty acid with sugars such as sucrose or sorbitol, optionally followed by ethoxylation or propoxylation.

The amine, amide and ester derivatives are preferably used.

Examples of suitable fatty acid derivative cell opening agents include tallow diamines (which are complex mixtures of $C_{16}-C_{30}$ diamines), mixtures of tallow diamines with fatty acid esters such as the commercially available products INT 494/792/0, 494/792/1, 494/792/2 and 494/792/4 available from Munch Chemie-Labor and the following fatty acid diamines $C_{19}H_{38}(NH_2)_2$, $C_{23}H_{46}(NH_2)_2$ and $C_{25}H_{50}(NH_2)_2$.

Mixtures of two or more of the above described fatty acid based cell opening agents can be used.

These fatty acid based additional cell opening agents are used in amounts of between 0.1 and 20% by weight, preferably between 0.5 and 5% by weight and most preferably between 0.5 and 2% by weight based on the foam.

In case these fatty acid based additional cell opening agents are used amine catalysts can be used instead of or together with the metal salt catalyst described above.

Examples of suitable tertiary amine catalysts include dimethylcyclohexylamine, bis(dimethylaminoethyl)ether, tetramethylhexane diamine, triethylenediamine, N-methylmorpholine, pentamethyldiethylenetriamine, tetramethylethylenediamine, 1-methyl-4-dimethylaminoethylpiperazine, 3-methoxy-N-dimethylpropylamine, N-ethylmorpholine, diethylethanolamine, N-cocomorpholine, N,N-dimethylyl-N',N'-dimethyl isopropylpropylenediamine, N,N-diethyl-3-diethylaminopropylamine, dimethylbenzylamine (for example, Polycat 8, 9, 5, 43, BL11, BL17, Dabco T, DMP30, TMR, all available from Air Products and Niax A1, A99, A107, all available from Union Carbide). Preferred amine catalysts include Polycat 5, Polycat 43, Polycat BL11, Polycat BL17, Dabco T, Niax A1, Niax A99 and Niax A107.

The amine catalyst is used in amounts ranging from 0.1 to 1.5% by weight based on the total foam.

The catalyst package can vary from solely a metal salt catalyst (for example, Catalyst LB) to solely an amine catalyst (for example, Polycat 43 or Dabco T) and anything thereinbetween (for example, a mixture of Catalyst LB and Niax A1).

In order to obtain fine celled open celled polyurethane foams insoluble fluorinated compounds as described above can be used together with the isocyanate-reactive cyclic urea compounds and the catalysts.

In operating the process for making open celled rigid polyurethane foams, the known one-shot, prepolymer or semi-prepolymer techniques may be used together with conventional mixing methods.

The various aspects of this invention are illustrated but not limited by the following examples.

EXAMPLE 1

A cubic cavity is being filled with open celled rigid polyurethane foam using the ingredients listed in Table 1 below with Polyol 1 being a polyether polyol of OH value 495 mg KOH/g;

Polyol 2 being a polyol of OH value 1122 mg KOH/g;

Polyol 3 being a polyether polyol of OH value 540 mg KOH/g;

Polyol 4 being a polyether polyol of OH value 310 mg KOH/g;

Polyol 5 being a polyether polyol of OH value 52 mg KOH/g;

Tegostab B 8404 and B 8406 being silicone surfactants available from Goldschmidt;

Catalyst LB being a metal salt catalyst available from Imperial Chemical Industries;

Fixapret NF being a cyclic urea available from BASF;

PF 5060 being perfluorohexane available from 3M;

SUPRASEC DNR being polymeric MDI available from Imperial Chemical Industries (SUPRASEC is a trademark of Imperial Chemical Industries). The cavity is being evacuated to 1 mbar, filled with an insulating gas to 100 mbar, again evacuated to 1 mbar and filled with the insulating gas up to 1000 mbar and sealed.

The thermal conductivity is being measured at 10° C. (standard ISO 2581 INITIAL) (in mW/mK).

Results are indicated in Table 2.

TABLE 1

|  |  | Foam No. 1 | Foam No. 2 |
|---|---|---|---|
| Polyol 1 | pbw | 20 | 50 |
| Polyol 2 | pbw |  | 10 |
| Polyol 3 | pbw | 30 | 15 |
| Polyol 4 | pbw | 30 |  |
| Polyol 5 | pbw | 20 | 25 |
| Tegostab B 8406 | pbw | 4 |  |
| Tegostab B 8404 | pbw |  | 4 |
| Catalyst LB | pbw | 0.1 | 3 |
| Fixapret NF | pbw | 1.6 | 6.1 |
| PF 5060 | pbw | 4 | 6.8 |
| water | pbw | 0.15 |  |
| SUPRASEC DNR | pbw | 153.7 | 231 |
| Core Density | kg/m$^3$ | 57 | 31.3 |
| Closed Cell Content | % | 0 | 1 |

TABLE 2

| Insulating gas | Foam No. 1 | Foam No. 2 |
|---|---|---|
| vacuum | 5.1 | 6.4 |
| air | 26.9 | 25.7 |
| CO$_2$ |  | 18.8 |
| SF$_6$ | 15.9 | 15.7 |
| HFC 134a |  | 15.9 |
| HCFC 22/142b (40/60) |  | 14.7 |
| Krypton |  | 13.9 |

EXAMPLE 2

Rigid polyurethane foams were made from the ingredients listed in Table 3 below with Polyol A: a polyether polyol of OH number 490 mg KOH/g and functionality 4.2.

Polyol B: a polyether polyol of OH number 540 mg KOH/g and functionality 3.

MEG: monoethyleneglycol.

Arcol 1010: polypropylene glycol (OH number 112 mg KOH/g) available from Arco.

Surfactant: a silicone surfactant.

Nonyl Phenol: an alkoxylated nonyl phenol.

Catalyst LB: a metal salt catalyst available from Imperial Chemical Industries.

Cell opening agent: Munch Chemie 494/792/2 which is a blend of tallow diamine and fatty acid ester available from Munch Chemie.

Fixapret NF: a cyclic urea available from BASF.

Polyisocyanate: a polymeric MDI composition.

The ingredients of the polyol blend were weighed out in grams and mixed well with shaking and stirring in a suitable container. Once the blend was well mixed the container was sealed and the temperature of the blend was adjusted to 30° C.

The polyisocyanate was also adjusted to 30° C. and 248 g thereof was pre-weighed out into a suitable tarred container.

The polyisocyanate was added to the polyol blend rapidly and the reacting mixture was stirred for ten seconds using a high shear mixer (3000 RPM) fitted with a suitable bladed propeller mixer as is used in standard laboratory foam preparation/testing.

After ten seconds the reaction mix was poured into an open metal box mould heated to 50° C. After pouring a floating lid was placed on the rising foam to simulate restricted moulding rather than so-called free rise foaming. After a period of time (>15 minutes) the foam was removed from the mould and allowed to cure at ambient temperature for 24 hours. After this time the foam was cut to allow testing for density and closed cell content.

Density was measured according to standard DIN 53420. The restricted moulded density was in the range 35 to 40 kg/m³ for all of the prepared foams. Closed cell content was measured according to standard BS 4370 Method 10 using a Micromeretics closed cell measuring machine as is commercially available. The closed cell content was measured in the core of the restricted moulded foam as well as in the surface area of the restricted moulded foam close to the foam skin (~1 cm). A range of closed cell content was measured depending on the proximity to a mould edge (the closer the measuring point is to a mould edge the higher the closed cell content)

Free rise foams were also made from the same formulations (so without the floating lid). The free rise density was in the range 22 to 26 kg/m³ for all of the prepared foams. Closed cell content of this free rise foam was measured as well.

Foams were also made with a fixed lid instead of a floating lid to simulate high overpack (about 25%). Closed cell content of these foams was measured as well.

The results are presented in Table 3.

These results show that by using isocyanate-reactive cyclic ureas in combination with fatty acid derivatives as cell opening agents foams are obtained with decreased closed cell content and reduced gradient in closed cell content especially at high overpack conditions. Thus these foam-formulations are very suitable for filling cavities of thermal devices according to the present invention.

TABLE 3

| Foam No. | | 3 | 4 |
|---|---|---|---|
| POLYOL BLEND | | | |
| Polyol A | pbw | 77 | 77 |
| Polyol B | pbw | 10 | 10 |
| MEG | pbw | 5 | 5 |
| Arcol 1010 | pbw | 10 | 10 |
| Surfactant | pbw | 1.0 | 1.0 |
| Nonyl Phenol | pbw | 10 | 10 |
| water | pbw | 2 | 2 |
| Catalyst LB | pbw | 2 | 2 |
| Cell opening agent | pbw | | 3.5 |
| Fixapret NF | pbw | 7.6 | 7.6 |
| Polyisocyanate | pbw | 248 | 248 |
| Closed cell content | | | |
| Moulded Foam Core | % | 15–30 | 5–15 |
| Moulded Foam Surface | % | 40–80 | 10–30 |
| Free Rise Foam | % | 0–5 | 0–5 |
| Moulded Foam High Overpack (25%) Core | % | 30–70 | 5–15 |

We claim:

1. Method for making a thermal insulating unit or a device containing such a unit, said unit comprising a core of open celled organic foamed insulating material located between outer and inner walls of the unit, comprising the steps of
   a) foaming of insulating material in a cavity between the outer and inner walls of the unit;
   b) evacuating the foamed cavity;
   c) refilling the foamed cavity with an insulating gaseous composition and,
   d) sealing the cavity wherein the open celled organic foamed insulating material comprises open celled rigid polyurethane or urethane-modified polyisocyanurate foam prepared by reacting an organic polyisocyanate with a polyfunctional isocyanate-reactive composition in the presence of an isocyanate-reactive cyclic compound of formula (I)

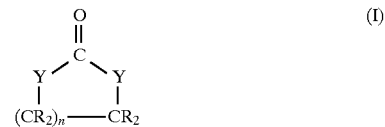

wherein in formula (I)
   Y is O or NR¹ where each R¹ independently is a lower alkyl radical of $C_1$–$C_6$ or a lower alkyl radical substituted with an isocyanate-reactive group; each R independently is hydrogen, a lower alkyl radical of $C_1$–$C_6$ or $(CH_2)_m$—X wherein X is an isocyanate-reactive group which is OH or $NH_2$ and m is 0, 1 or 2, and n is 1 or 2; with the proviso that at least one of R¹ or R is or comprises an isocyanate-reactive group, and
   wherein the method is performed in the presence of a cell opening agent selected from the group consisting of fatty acids, fatty acid amines, fatty acid amides and fatty acid esters.

2. Method according to claim 1 wherein the insulating gaseous composition has a boiling point below 10° C.

3. Method according to claim 1 wherein the insulating gaseous composition has a thermal conductivity at the operational temperature of the unit of below 25 mW/mK.

4. Method according to claim 1 wherein the insulating gaseous composition does not contain any chlorine atoms.

5. Method according to claim 1 wherein the insulating gaseous composition comprises an insulating gas selected from the group consisting of Krypton, Xenon, sulfur hexafluoride, 1,1,1,2-tetrafluoroethane, 1,1-dichloro-1-fluoroethane, 1-chloro-1,1-difluoroethane and chlorodifluoromethane.

6. Method according to claim 1 wherein the compound of formula (I) corresponds to

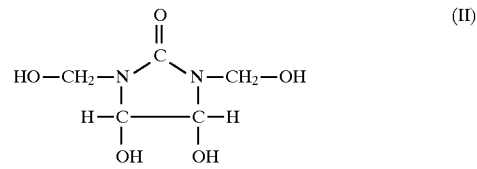

or

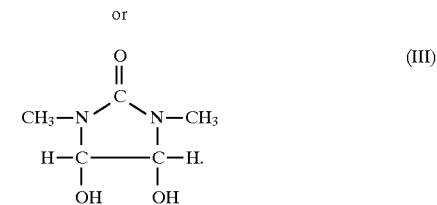

7. Method according to claim 1 wherein said additional cell opening agent comprises tallow diamine.

8. Method according to claim 1 wherein said additional cell opening agent is used in an amount of between 0.5 and 5% by weight based on the total foam.

9. Method according to claim 1 wherein the process is carried out in the presence of a metal salt catalyst and/or an amine catalyst.

10. Method according to claim 1 wherein the process is carried out in the presence of an insoluble fluorinated compound.

* * * * *